United States Patent
Kaku et al.

(10) Patent No.: US 7,019,611 B2
(45) Date of Patent: Mar. 28, 2006

(54) MODEM COUPLING CIRCUIT FOR POWER-LINE CARRIER

(75) Inventors: Takashi Kaku, Tokyo (JP); Fumishiro Tsuda, Sendai Miyagi (JP); Toshiro Tojo, Tokyo (JP); Toyomi Obikawa, Tokyo (JP); Toshiya Sato, Sendai Miyagi (JP); Hideaki Yamauchi, Sendai Miyagi (JP); Masahiko Kunii, Sendai Miyagi (JP)

(73) Assignees: Honda Electron Co., Ltd., Tokyo (JP); NEC Tokin Corporation, Sendai (JP)

( * ) Notice: Subject to any disclaimer, the term of this patent is extended or adjusted under 35 U.S.C. 154(b) by 11 days.

(21) Appl. No.: 10/803,083

(22) Filed: Mar. 18, 2004

(65) Prior Publication Data
US 2004/0263282 A1   Dec. 30, 2004

(30) Foreign Application Priority Data
Mar. 19, 2003 (JP) ............................. 2003-076460

(51) Int. Cl.
  *H01F 17/06* (2006.01)
(52) U.S. Cl. .................................................... 336/178
(58) Field of Classification Search ................ 336/65, 336/83, 178, 180–186; 379/349, 378, 402, 379/399.01
See application file for complete search history.

(56) References Cited

U.S. PATENT DOCUMENTS 3,627,952 A * 12/1971 Person ................. 379/399.01
3,781,483 A * 12/1973 Deisch ...................... 379/378
4,646,319 A *  2/1987 Engel et al. ................ 375/220
4,982,426 A *  1/1991 Jakab ......................... 379/402
5,255,317 A * 10/1993 Arai et al. ............. 379/399.02

FOREIGN PATENT DOCUMENTS

| JP | 8-98277 | 4/1996 |
| JP | 2001-136107 | 5/2001 |
| JP | 2001-186063 | 7/2001 |
| JP | 2001-267139 | 9/2001 |

* cited by examiner

Primary Examiner—Tuyen T Nguyen
(74) Attorney, Agent, or Firm—Armstrong, Kratz, Quintos, Hanson & Brooks, LLP

(57) ABSTRACT

A modem coupling circuit comprising: (a) a transformer 1 having a core 1a including a gap formed therein, primary windings N1a, N1b constituting a bifilar wound coil which is wound around the core 1a, forming a single layer and connected to power lines L1, L2, and a secondary winding N2 connected to a transmitting circuit 2 and a secondary winding N3 connected to a receiving circuit 3, the secondary windings N2, N3 holding the single layer of the primary windings between; (b) a coupling capacitor C1 connected to a middle point between first ends of the primary windings, the first ends being not connected to the power lines L1, L2; (c) current limiting resistances R1a, R1b connected to the primary windings N1a, N1b having a bifilar construction; (d) drive resistances R2a, R2b connected to the secondary winding for transmission N2; and (e) terminating resistances R3a, R3b connected to the secondary winding for reception N3.

7 Claims, 13 Drawing Sheets 3 (A)

3 (B)

5(A)

5(B)

MODEM COUPLING CIRCUIT FOR POWER-LINE CARRIER

TECHNICAL FIELD

The present invention relates to a modem coupling circuit for coupling power lines to a modem in a power line carrier system.

BACKGROUND ART

Power line carrier systems are for transmitting and receiving various kinds of data, utilizing power lines as a transmission channel. There have been proposed a variety of power line carrier systems some of which have been already put to practical use. It is known that coupling of power lines to a modem in such systems is established by a coupling circuit composed of a capacitor, a coupling circuit composed of a transformer, or coupling circuit composed of a capacitor and transformer. For instance, in a known system, the primary winding of a transformer is connected to a power line through a capacitor whereas the secondary winding of the transformer is connected to a receiving circuit. Another known system includes a communication device that is coupled through a transformer to power lines.

There is known a transformer for use in communication, in which multi-core parallel lines formed by connecting a plurality of core wires in parallel are wound around a core to form a primary winding and an ordinary core wire is wound around the core to form a secondary winding. According to another known arrangement, three secondary windings connected in series are provided for a transformer, two of which are connected to a transmitting circuit through a resistance and a receiving circuit is connected to the three serial secondary windings through a resistance, thereby forming a secondary winding portion for common use in transmission and reception. With this arrangement, the level of transmitter signals is increased while a reverberation elimination circuit is simplified (Japanese Patent (Kokai) Publication No. 8-98277, Japanese Patent Publication Nos. 2001-186063, 2001-267139, 2001-136107).

Transformers are generally classified into two types, namely, for power line use and communication use. In power line transformers, power conversion efficiency susceptible to noise, distortion or the like is an important factor, whereas communication transformers give great importance to distortion-free transmission of minute signals. Transformers for use in a power-line carrier system are similar to communication transformers but need to be connected to power lines having a voltage as high as 100V or more, whereas communication transformers are connected to low-voltage communication lines. In addition, the fact that noise components having great amplitude are superimposed on such power lines should be taken into account.

To sum up, the requirements for transformers for use in a power-line carrier system are as follows: First of all, they are required to have a high current drive capability, small size, high cost performance and high efficiency. Secondly, their line capacity should be as small as possible in order to attain the highest possible common mode impedance. Thirdly, it is necessary to make ground balance as large as possible at the transmitting end to minimize a leak magnetic field by minimizing a common mode leak current. At the receiving end, the possible greatest ground balance is also required for improved common mode noise resistance. Fourthly, it is necessary to make transmission THD (Total-Harmonic-Distortion) as great as possible in order to minimize undesired out-of-band spurious response and to make noise THD as great as possible in order to enable reception of signals of minute amplitude in environments where great amplitude noise exists. Fifthly, the current peak point needs to be within the transmission band in order to enable efficient high current drive and the lowest possible impedance drive. Sixthly, it is necessary to make transmission characteristics as flat as possible in order to achieve stable receiving characteristics.

Concretely, the above requirements are met by setting the following conditions. At the transmitting end, the drive current at the line side is 1.4 A or more in maximum, and a low drive impedance within the range of 1.0 to 3.0Ω is obtained. For effective input of a signal, the current peak point is set in the transmission band (150 kHz to 450 kHz). The distortion of a transmitter signal (transmission THD) is adjusted to the spurious modulation standards (56 dBμV or less at 450 kHz to 5 MHz, and 60 dBμV or less at 5 MHz to 30 MHz) stipulated by the rule No. 46 of the Radio Law. At the receiving end, the ground balance is 50 dB or more, the noise THD is 60 dB or more, the group delay characteristic is 3 μs or less within the transmission band, and the fine receiver signal level is −95.0 dBm/kHz or less (when the required S/N is 15 dB).

The conventional transformers called "communication transformers" and the conventional transformers for a power line carrier do not satisfy all of the six requirements listed above nor propose any means for overcoming the above problems.

Therefore, a primary object of the invention is to provide a modem coupling circuit for a power line carrier, the circuit including a transformer which is designed to satisfy all of the first to sixth requirements.

DISCLOSURE OF THE INVENTION

Referring to FIG. 1, there is provided a modem coupling circuit for a power line carrier according to the invention, which is connected to power lines for transmitting and receiving data, the modem coupling circuit comprising:
  (a) a transformer 1 having
    a core 1a including a gap formed therein,
    primary windings N1a, N1b constituting a bifilar wound coil which is wound around the core 1a, forming a single layer; and
    a secondary winding N2 connected to a transmitting circuit 2 and a secondary winding N3 connected to a receiving circuit 3, the secondary windings N2, N3 holding the single layer of the primary windings therebetween from above and below;
  (b) a coupling capacitor C1 connected to a middle point between first ends of the primary windings having a bifilar construction such that the primary windings having a bifilar construction are serially connected to each other with their second ends being connected to the power lines L1, L2 respectively; and
  (c) current limiting resistances connected to the primary windings N1a, N1b having a bifilar construction, respectively.

The transformer 1 and the coupling capacitor C1 are designed so as to satisfy first to fourth ranges,
  the first range being a range of inductance which is large enough to fully satisfy a transmitter signal distortion characteristic and a noise distortion characteristic within a low frequency band of a transmission band for signals transmitted through the transformer 1;

the second range being a range of inductance which is small enough to bear high current drive and great amplitude noise current;

the third range being a range of a combined value of inductance and coupling capacitance which value is large enough to allow a series resonance frequency of the inductance of the primary windings of the transformer and the coupling capacitor to be a low frequency outside the transmission band of the signals; and the fourth range being a range of a combined value of a leakage inductance of the transformer and the coupling capacitance which value allows a series resonance frequency of the leakage inductance and the coupling capacitor to be within the transmission band.

The transformer 1 may be designed such that the gap of the core 1a is formed according to a permissible current value of the primary windings and a desired inductance. Further, the invention may be designed such that the current limiting resistances are connected to the primary windings of the transformer 1, the transmitting circuit 2 is connected to the secondary winding for transmission N2 of the transformer 1 through drive resistances R2a, R2b, terminating resistances R3a, R3b are connected to the secondary winding for reception N3 of the transformer 1, and the receiving circuit 3 is connected to the secondary winding for reception N3. In addition, n of the turns ratio n:1 of the secondary winding for transmission N2 to the primary windings of the transformer 1 may be set to about 2, and m of the turns ratio m:1 of the secondary winding for reception N3 to the primary windings may be set to a value by which the environmental noise level becomes substantially equal to the floor noise level. The inductance of the transformer 1 is set to 40 μH±10 μH by the provision of the gap of the core 1a for the transformer 1.

BEST MODE FOR CARRYING OUT THE INVENTION

Figure 1:
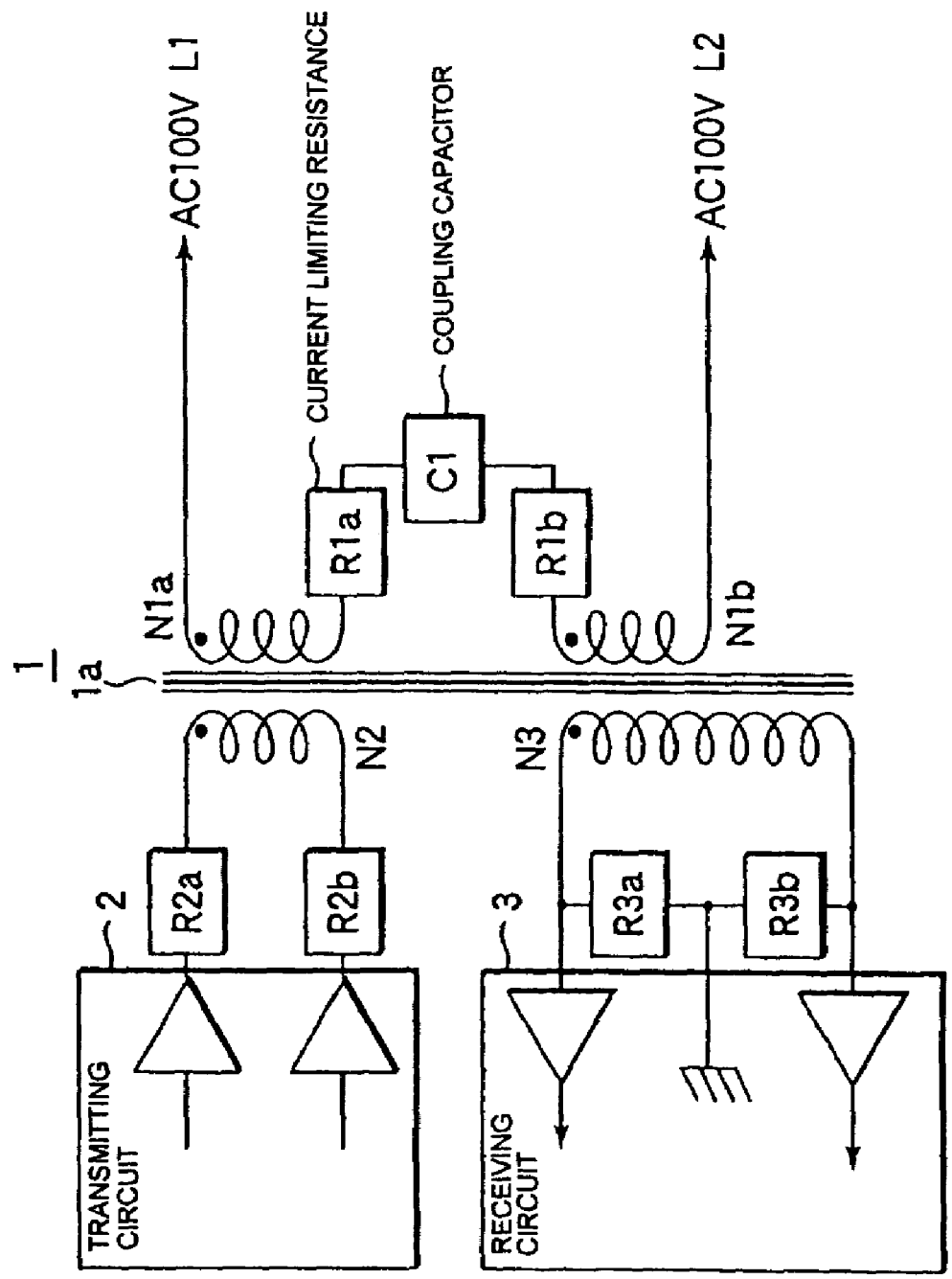
FIG. 1 is an explanatory diagram of an embodiment of the invention.

FIG. 1 is an explanatory diagram of an embodiment of the invention. Reference numerals 1, 1a designate a transformer and a core, respectively. N1a and N1b designate primary windings which constitute a bifilar wound coil. N2 designates a secondary winding for transmission and N3 designates a secondary winding for reception. 2 designates a transmitting circuit and 3 designates a receiving circuit. C1 designates a coupling capacitor. R1a and R1b each designate a current limiting resistance, and R2a and R2b each designate a drive resistance. R3a and R3b each designate a terminating resistance, and L1 and L2 each designate a power line.

The transformer 1 is comprised of a core having a gap formed therein; the primary windings N1a, N1b which constitute a bifilar wound coil; and the secondary windings N2, N3 having an ordinary coil construction. The primary windings N1a, N1b having a bifilar construction are serially connected to each other through the coupling capacitor C1, thereby forming a primary winding N1. Although the current limiting resistance R1a is connectively interposed between the coupling capacitor C1 and the primary winding N1a whereas the current limiting resistance R1b is connectively interposed between the coupling capacitor C1 and the primary winding N1b in this embodiment, these current limiting resistances R1a, R1b may be connected to the power lines L1, L2 respectively. It is also possible to employ only either of them.

Connectively interposed between the transmitting circuit 2 and the secondary winding for transmission N2 are the drive resistances R2a, R2b. The receiving circuit 3 is connected to the secondary winding for reception N3, together with the terminating resistances R3a, R3b. More specifically, the secondary winding N3 is terminated by the terminating resistances R3a, R3b and connected to the receiving circuit 3. Accordingly, the secondary winding for transmission N2 and the secondary winding for reception N3 are connected so as to be serially separated from each other.

Figure 2:
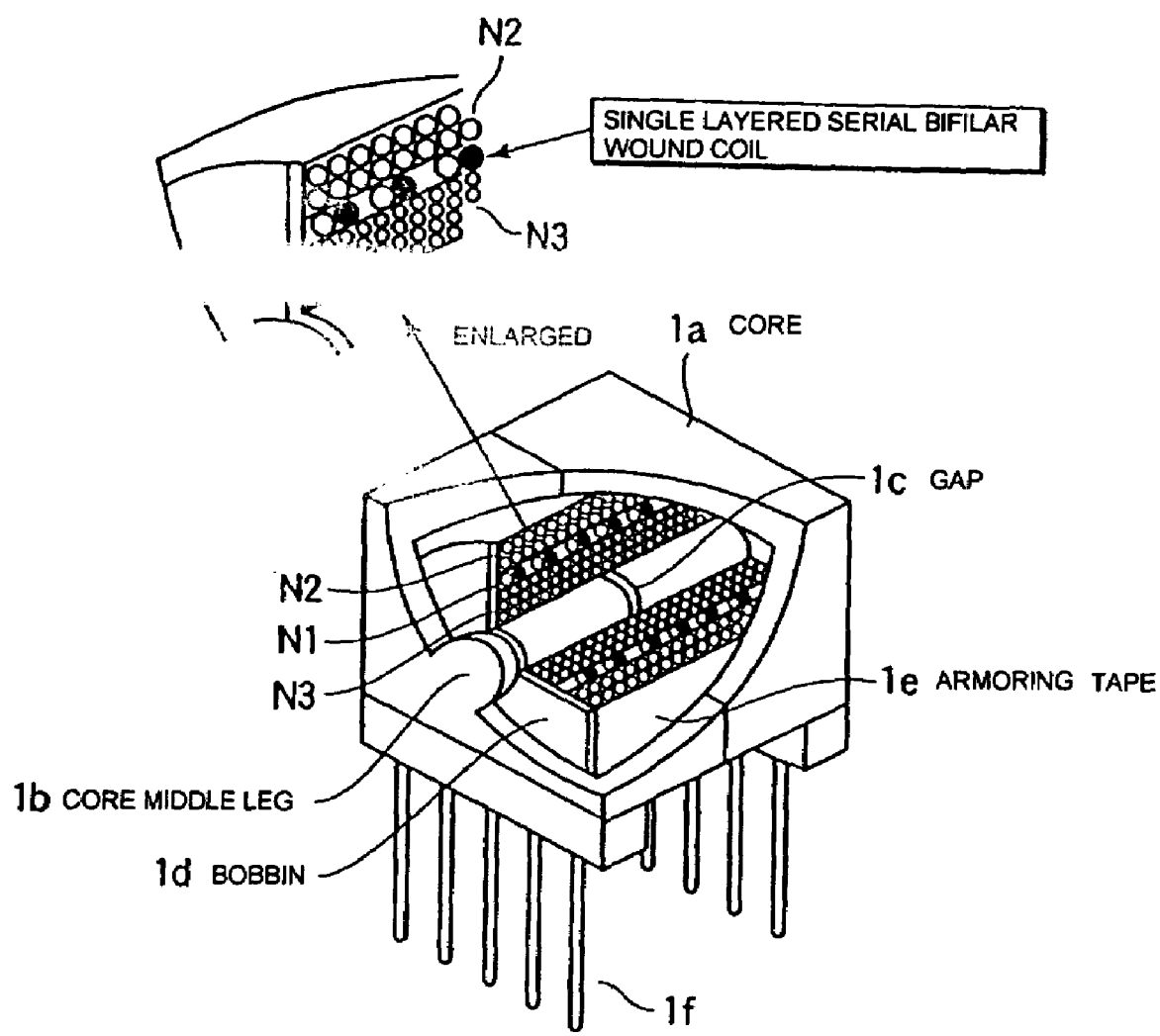
FIG. 2 is an explanatory diagram of a transformer.

FIG. 2 is a partially cut-away explanatory diagram of the transformer 1. The transformer 1 includes a gap 1c that is formed in a core middle leg 1b located at the center of the core 1a. The secondary winding for reception N3 is wound around the core middle leg 1b and the primary winding N1 having a bifilar construction is wound over the secondary winding N3 so as to form a single layer. Then, the secondary winding for transmission N2 is wound over the primary winding N1. Reference numerals 1d, 1e and 1f denote a bobbin, an armoring tape and connecting pins respectively. Concretely, the secondary windings N2, N3 are so formed as to hold the primary winding N1 therebetween from above and below thereby reducing leakage inductance. As seen from FIG. 2 that shows a partially enlarged sectional view of the transformer 1, the primary winding N1 has a bifilar wound coil structure in which two core wires (the primary windings N1a, N1b) indicated by black and white circles are wound in parallel. The primary winding N1 is formed such that a first end of the primary winding N1a is serially connected to a first end of the primary winding N1b through at least the coupling capacitor C1, whereas second ends of them are connected to the power lines L1, L2 respectively.

Although the core middle leg 1b has a circular section in FIG. 2 but may have other shapes. Where the core middle leg 1b is circular in section, the windings can be easily wound around it, compared to the case where the section of the core middle leg 1b is rectangular or the like. Although the gap 1c is located in the middle of the core middle leg 1b so as to divide the leg 1b into two parts and formed so as to be perpendicular to the axis of the leg 1b, the position of the gap 1c may be shifted to the right or left from the position shown in FIG. 2. The opposed cross-sectional surfaces which define the gap 1c may be perpendicular or inclined with respect to the axis of the core middle leg 1b. In addition, a nonmagnetic material such as synthetic resin may be injected into the gap 1c, thereby fixing the core middle leg 1b having the opposed sectional surfaces. In view of ground balance etc., it is advisable to form the gap 1c in the middle part of the core middle leg 1b as shown in FIG. 2.

Figure 3:
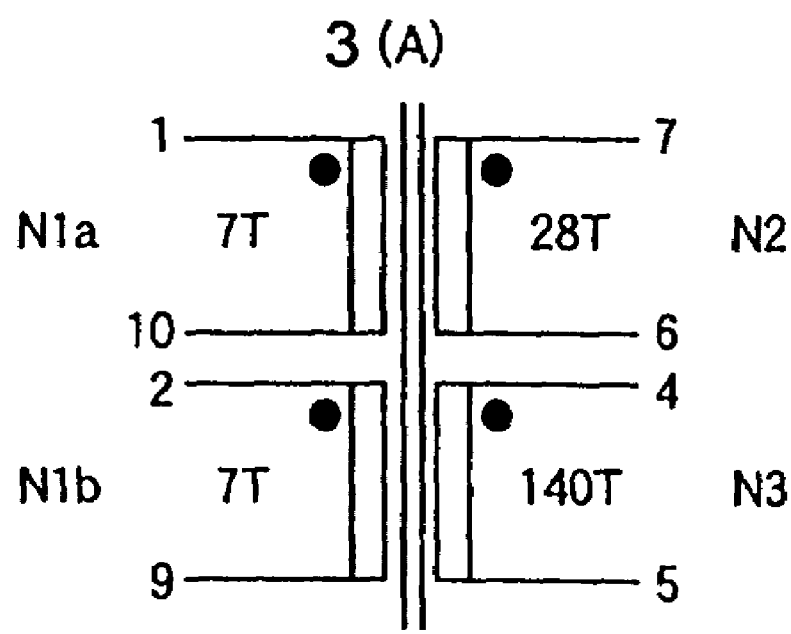
FIG. 3 is explanatory diagrams showing the pin positions of the transformer.
Figure 3:
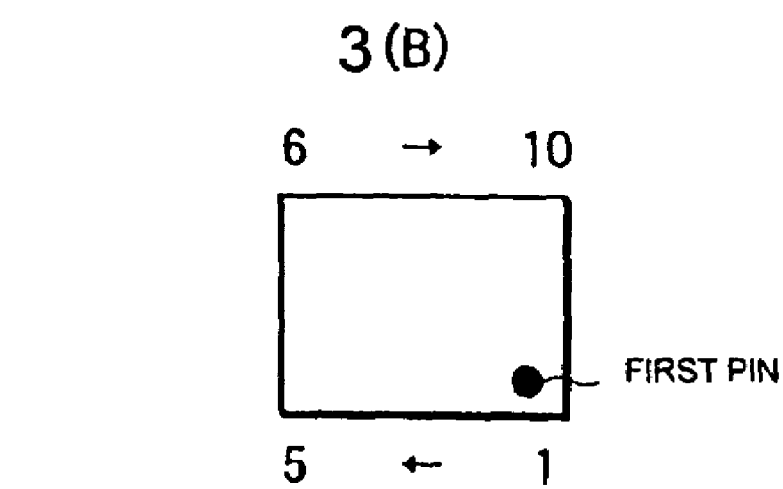

FIG. 3 is an explanatory diagram showing the pin positions of the transformer. FIG. 3(A) shows the pin Nos. of the connecting pins 1f (see FIG. 2) for the primary windings N1a, N1b and for the secondary windings N2, N3. The primary winding N1 has a bifilar construction composed of the serially connected primary windings N1a, N1b having 7T (7 turns) as described earlier, so that the primary winding N1 has 14T in total. In this embodiment, the secondary winding for transmission N2 has 28T, whereas the secondary winding for reception N3 has 140T. FIG. 3(B) shows the transformer viewed from above. The first pin is indicated by black circle and the first to fifth pins are aligned in the direction indicated by an arrow. The sixth to tenth pins are aligned in the direction indicated by another arrow. Thus, the respective positions of the connecting pins 1f (see FIG. 2) connected to the windings of the transformer can be clarified.

Figure 4:
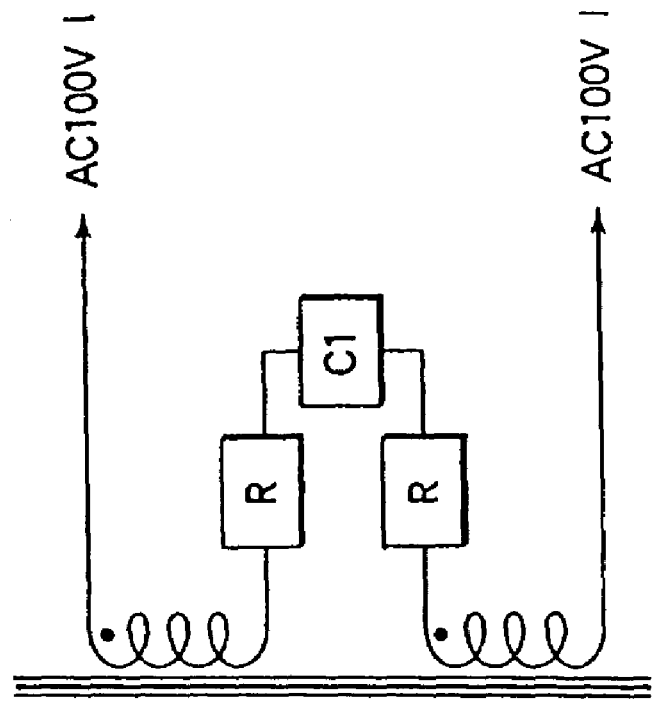
FIG. 4 is explanatory diagrams each showing a bifilar construction.
Figure 4:
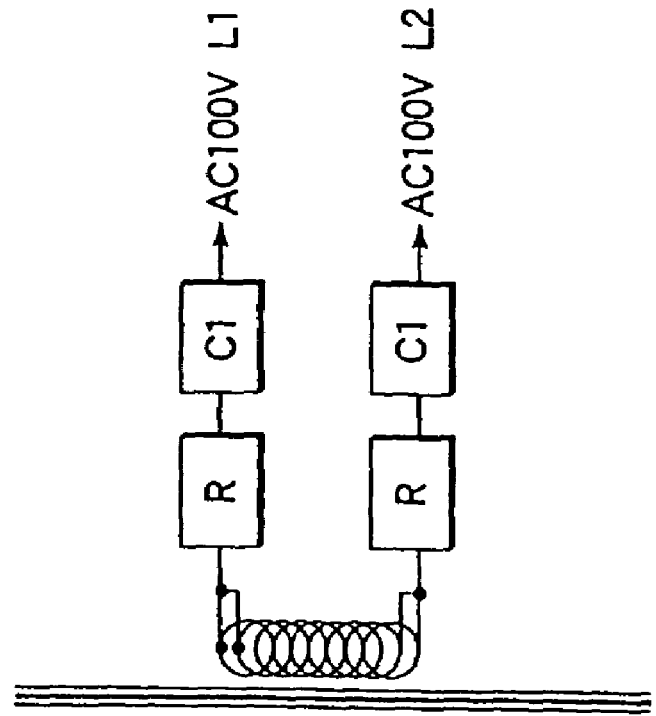

FIG. 4 shows explanatory diagrams showing bifilar constructions. Specifically, FIG. 4(A) shows an ordinary primary winding having a parallel bifilar construction, whereas FIG. 4(B) shows a primary winding applied to the invention, which employs a serial bifilar construction. Reference numeral C1 denotes a coupling capacitor and R denotes a current limiting resistance. In the parallel bifilar construction, two core wires are wound like a single core wire as shown in FIG. 4(A). In contrast with this, the serial coil construction is formed such that each of two core wires is open at both ends and the two core wires are serially connected at their first ends through the coupling capacitor C1 and the current limiting resistance R or through the coupling capacitor C1 alone. The second ends of the core wires are connected to the power lines L1, L2, respectively.

General communication transformers use a core having an amplitude permeability (μ) of about 12000 in many cases, but such a core is costly. The invention can use a comparatively inexpensive core having an amplitude permeability (μ) of about 4000. It is conceivable to select the size of the core 1a from (1) Type A: 20×20×16 (mm); (2) Type B: 15×15×14 (mm); and (3) Type C: 8×10×11 (mm). In the case of Type A, a drive current of about 3 A is permissible and the line capacity is about 100 pF. In the case of Type B, a drive current of about 1.4 A is permissible and the line capacity is about 50 pF or less. In the case of Type C, a drive current of about 0.4 A is permissible and the line capacity is about 14 pF or less. In view of the conditions of current drive, volume and line capacity, Type B is desirable.

Figure 5:
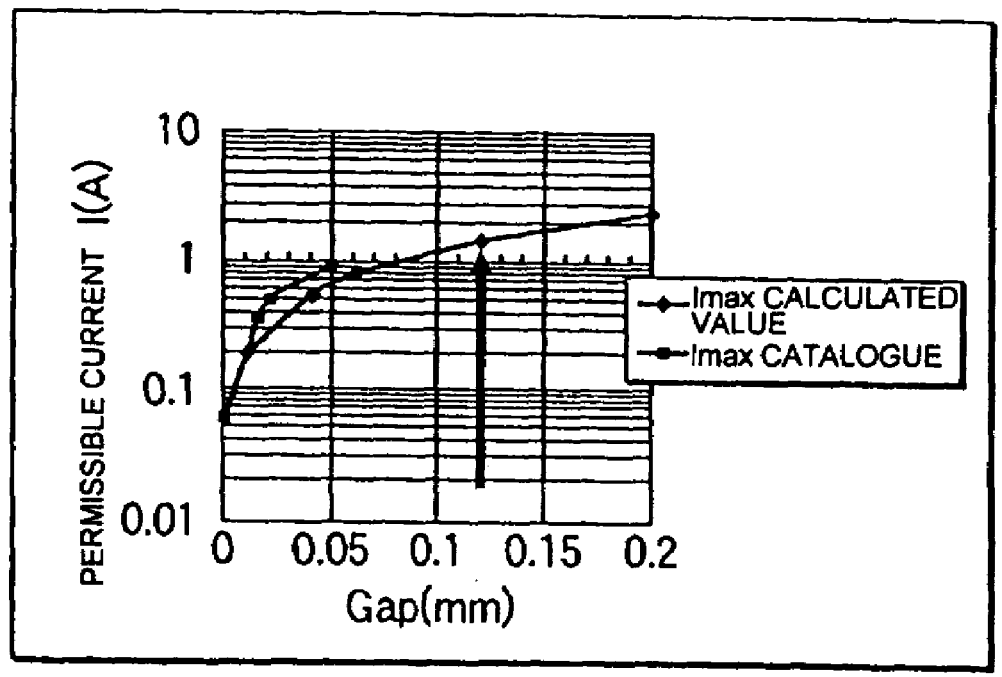
FIG. 5 is explanatory diagrams of a gap of a core, a permissible current characteristic and an inductance characteristic.
Figure 5:
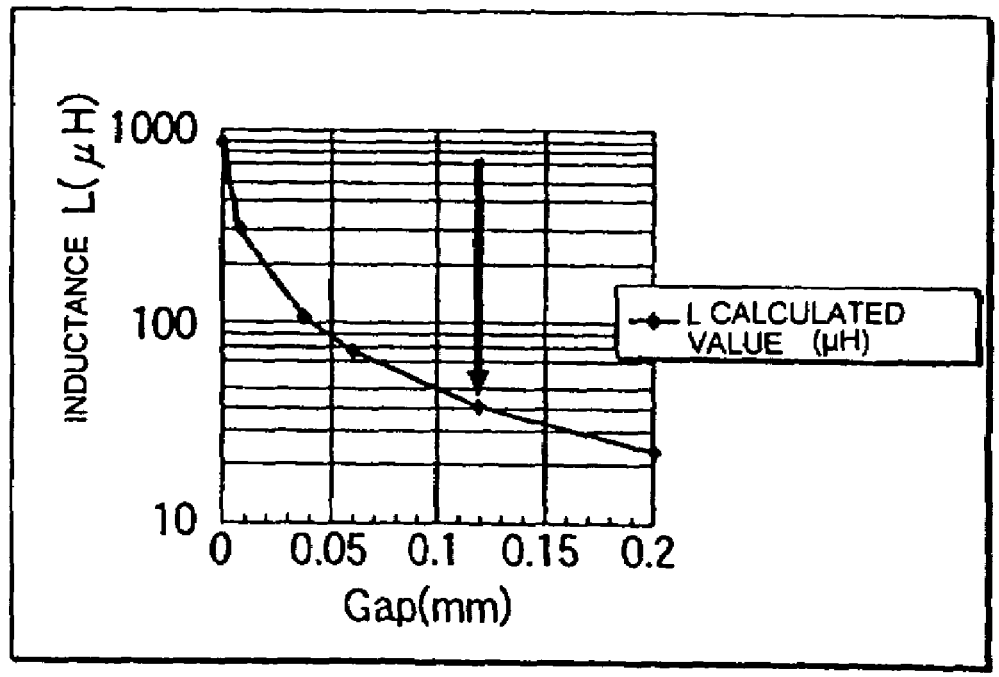

General communication transformers use a core having high amplitude permeability and no gaps as described earlier. In contrast with this, the transformer 1 of the invention has the core 1a provided with the gap 1c formed therein. FIG. 5(A) shows a permissible current I(A) characteristic for the gap Gap (mm) of the core 1a in a case where the amplitude permeability of the core 1a is 4000 and Type B is selected as the size of the core 1a. FIG. 5(B) shows an inductance L (μH) characteristic for the gap Gap (mm) of the core 1a.

In view of the transmission THD (Total Harmonic Distortion) in the low-frequency band and the noise THD, it is preferable that the inductance of the primary side of the transformer connected to the power lines be as great as possible. The reason for this is that if the inductance is small, impedance becomes small in the low-frequency band so that the current flowing into the windings increases, resulting in deterioration of the THD characteristics.

Figure 7:
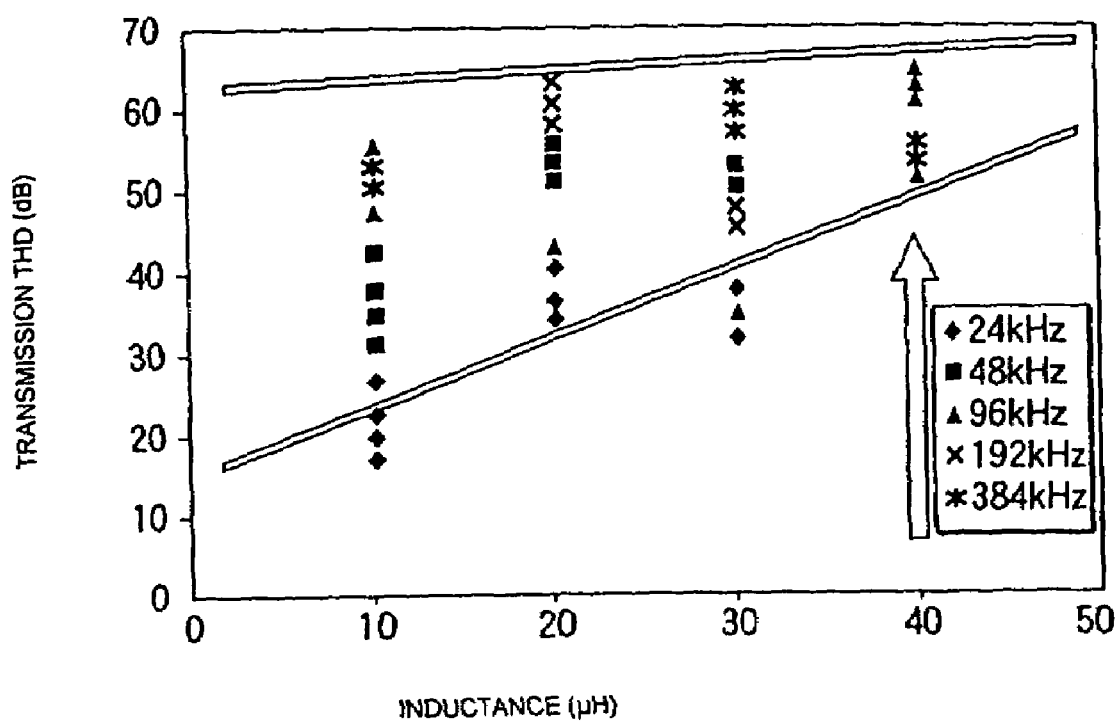
FIG. 7 is an explanatory diagram showing the relationship between inductance and transmission THD.

FIG. 7 shows the relationship between the inductance (μH) of the transformer and the transmission THD (dB) at frequencies of 24 kHz, 48 kHz, 96 kHz, 192 kHz and 384 kHz. When the inductance is as small as about 10 μH, the transmission THD characteristic in the low-frequency band significantly deteriorates. Therefore, the inductance of the transformer should be at a certain level, and more specifically, it should be less than 40 μH in order to obtain a transmission THD level no less than 50 dB.

Figure 8:
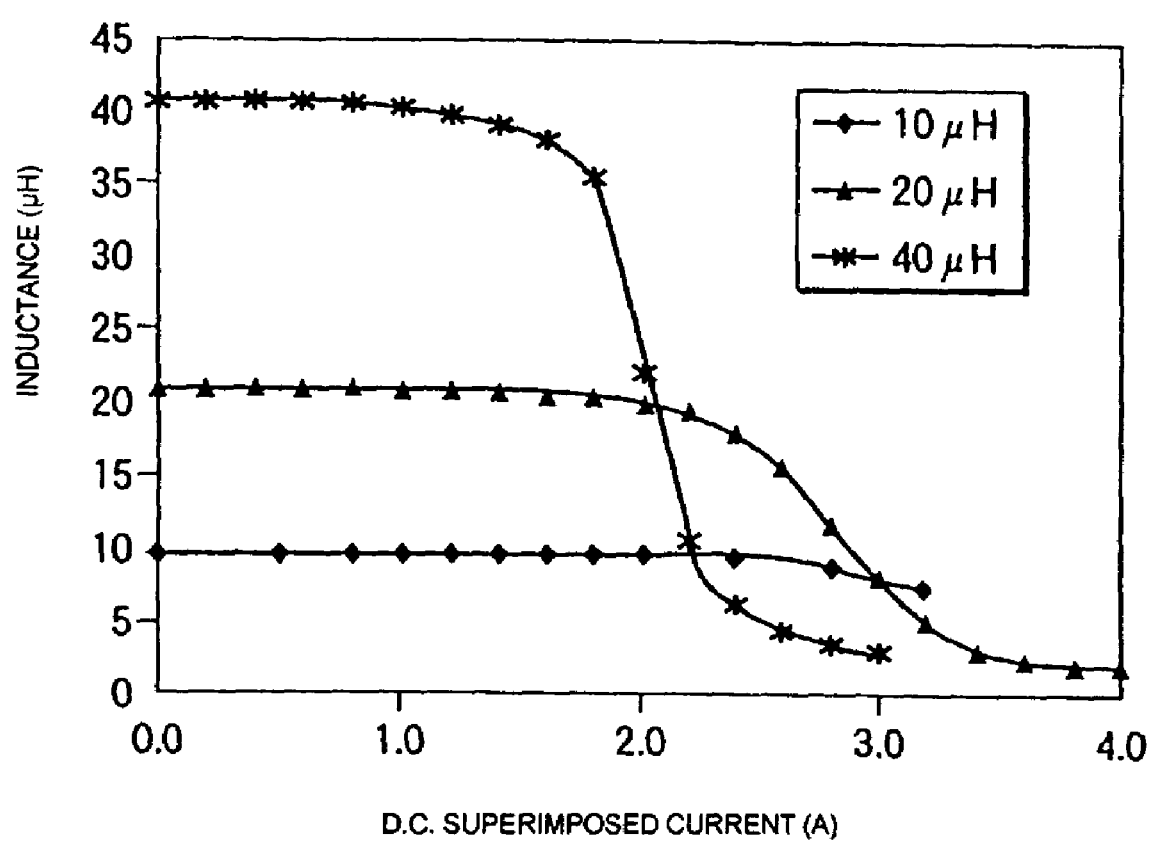
FIG. 8 is an explanatory diagram of a direct current superimposition characteristic.

FIG. 8 shows an explanatory diagram showing the levels of a direct current superimposition characteristic when the inductance is 10 μH, 20 μH and 40 μH. As the number of turns T, that is, the inductance (proportional to the square of the number of turns T) increases, the value of saturation current rapidly decreases. Therefore, a certain direct current superimposition characteristic level is necessary for a transformer for a power-line carrier. More concretely, the transformer should be endurable to superimposition of a direct current of about 1.4 A. Therefore, an inductance of no less than about 40 μH is required.

As has been explained earlier, as the number of turns of the windings of the transformer increases, the inductance increases and the transmission THD characteristic becomes good as shown in FIG. 7, but the direct current superimposition characteristic deteriorates as shown in FIG. 8. In short, there is an optimum value for the inductance. Under the above-described conditions, if the deviation of the characteristic at the time of manufacture is about 25%, the optimum value of the inductance will be about 40 μH±10 μH.

Figure 6:
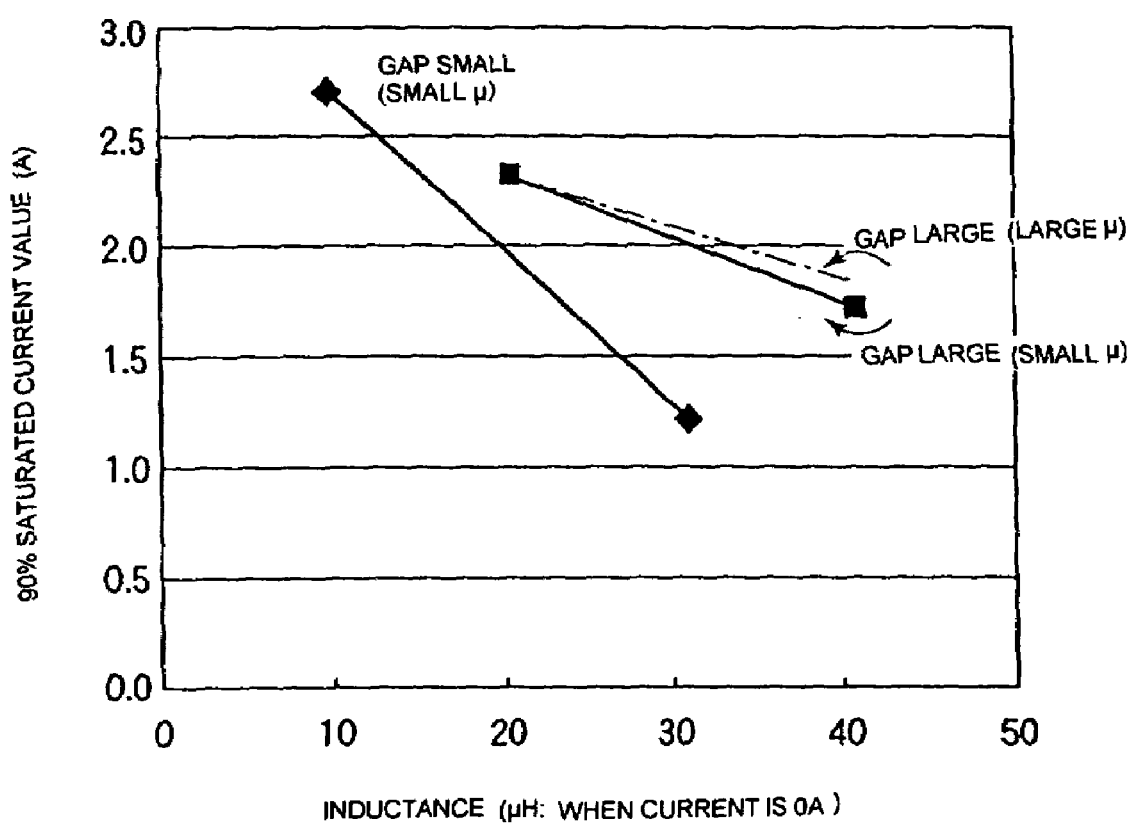
FIG. 6 is an explanatory diagram showing the relationship between the gap of the core and amplitude permeability.

FIG. 6 shows the relationship between the amplitude permeability of the core 1a and the gap. In FIG. 6, inductance (μH) is plotted on the abscissa and saturation current (A) is plotted on the ordinate. GAP SMALL and GAP LARGE indicate the size of the gap 1c of the core 1a. μ SMALL indicates that the amplitude permeability is 4000 and μ LARGE indicates that the amplitude permeability is 12000. It will be understood that while the gap 1c of the core 1a largely affects the inductance and saturation current characteristics, its influence upon the level of the amplitude permeability is negligible. In view of this, it is possible to use a relatively inexpensive core having an amplitude permeability (μ) of about 4000 and to obtain desired characteristics by provision of a gap.

As the gap 1c of the core 1a increases in size, the permissible current increases as seen from FIG. 5(A), but the inductance decreases as seen from FIG. 5(B). For instance, if the permissible current is about 1.4 A, the size of the gap 1c of the core 1a is about 0.12 mm and the inductance is about 40 μH. Since the variation in accuracy in manufacturing is usually about ±25%, the inductance can be set within the range of 40 μH±10 μH, depending on the size of the gap 1c of the core 1a.

Figure 9:
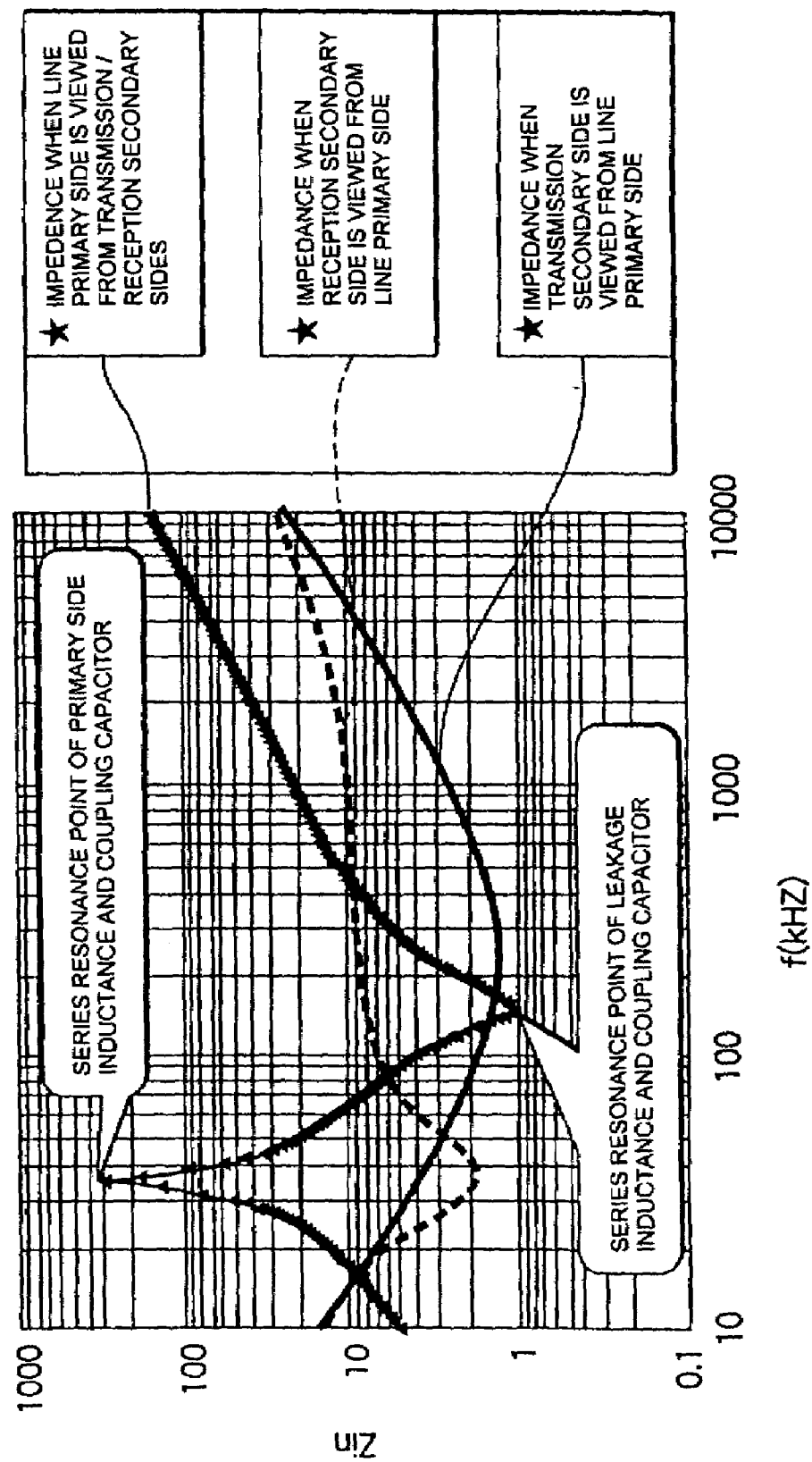
FIG. 9 is an explanatory diagram of resonance points.

FIG. 9 is an explanatory diagram of resonance points. In FIG. 9, frequency f (kHz) is plotted on the abscissa and impedance Zin is plotted on the ordinate. FIG. 9 shows a case where the series resonance point of the primary side inductance and the coupling capacitor is at a frequency of 100 kHz or less with respect to an impedance curve obtained when the line primary side (i.e., the primary winding N1 side) is viewed from the transmission/reception secondary sides (i.e., the secondary winding N2 side and the secondary winding N3 side) and where the series resonance point of a leakage inductance and the coupling capacitor is at a frequency of 100 kHz or more with respect to the above impedance curve.

An efficient signal input characteristic for the power lines can be obtained by setting the series resonance frequency of the leakage inductance and the coupling capacitor in a frequency range in the transmission band, for instance, 150 kHz to 450 kHz and setting the peak point of the drive current during transmission in the transmission band. The group delay characteristic deteriorates at the series resonance point of the inductance at the line primary side and the coupling capacitor, and therefore, this series resonance point is generally set in a frequency range outside the transmission band such as, for instance, 150 kHz or less.

Since the center frequency of the above transmission band is 300 kHz, the series resonance frequency of the inductance at the line primary side and the coupling capacitor is set to about 30 kHz or less in order to obtain a satisfactory group delay characteristic. Specifically, it is desirable to set the values of the leakage inductance and the inductance at the line primary side such that the former is less than $1/100$ of the latter. The leakage inductance can be made to be such a small value, by utilizing the sandwiching construction in which the primary winding N1 is held between the secondary winding for transmission N2 and the secondary winding for reception N3 as shown in FIG. 2.

There will be discussed the turns ratios of the secondary winding for transmission N2 and the secondary winding for reception N3 with respect to the primary winding N1 of the transformer 1. Where the ratio of the number of turns of the secondary winding for transmission N2 to the number of turns of the primary winding N1 is represented by n:1, as the turns ratio n increases, the possibility of low impedance drive increases. However, an increase in the possibility of low impedance drive is accompanied with an increase in D.C. resistance, resulting in an increase in the transmission loss at the transmitting end. On the other hand, if the turns ratio n decreases, it becomes difficult to enable low impedance drive in transmission. In short, there exists an optimum value for the turns ratio n. After simulation, it was found that the optimum value of n=2. If a core of Type B described above is used and the number of turns of the primary winding is 14T (the number of turns of each core wire constituting the bifilar would coil is 7T), the number of turns of the secondary winding for transmission N2 is 28T.

Where the ratio of the number of turns of the primary winding N1 to the number of turns of the secondary winding for reception N3 is represented by 1:m, as the turns ratio m increases, receiving of minute amplitude signals becomes possible, but an increase in the turns ratio m is accompanied with an increase in Q with the result that the transmission band becomes narrow. In addition, an increase in the turns ratio m causes an increase in D.C. resistance and therefore causes an increase in the transmission loss at the receiving end. If the minimum value of the noise level of the environment and the actual value of floor noise at the device side are within a feasible range, it is meaningless to increase the turns ratio m more than necessary.

Next, the minimum value of the turns ratio m of the second winding for reception N3 is calculated based on the environmental noise level at the line side and the floor noise level at the device side. According to the evaluation standard for environmental noise level prescribed by ITU-T (International Telecommunication Union-Telecommunication Standardization Sector), the standard values are −140 dBm/Hz and @ 50Ω.

Where the maximum allowable input voltage of a modem for a power line carrier is 6.2 Vpp and the sampling frequency when receiver signals are sampled with a 16-bit high-accuracy AD converter and digitized is 1.536 MHz, the maximum allowable level P is given by:

$$P = 6.2 \ (Vpp) \qquad (1)$$
$$= 20 \log (6.2/0.223606797)$$
$$= +28.86 \ (dBm)$$

The quantized noise L is described by:

$$L=6 \times 16 \ (bits)+1.8=97.8 \ (dB) \qquad (2)$$

Therefore, the floor noise level F is given by:

$$F=28.86 \ (dBm)-97.8 \ (dB)=-68.94d \ (dBm) \qquad (3)$$

Since the sampling frequency S is 1.536 MHz, the effective bandwidth is a half of the sampling frequency S, that is, 768 kHz. Therefore, the band converted value H is given by:

$$H = 10 \log (1/768000 \ (Hz)) \qquad (4)$$
$$= -58.85 \ (dB)$$

The floor noise level f per Hz is given by:

$$f = -68.94 - 58.85 \qquad (5)$$
$$= -127.79 \ (dBm/Hz)$$

Since the current limiting resistances R1a, R1b are included, a loss up to 6 dB will be caused. Further, a loss caused by the D.C. resistance of the transformer 1 should be taken into account up to about 1 dB. Therefore, the gain G which allows the floor noise level at the device side to be coincident with the environmental noise level at the line side (−140 dBm/Hz) is described by:

$$G = -127.79 - (-140.00) + 6 + 1 \qquad (6)$$
$$= 19.21 \ (dB)$$
$$= 9.13 \ (\text{turns ratio } m)$$

It will be therefore understood that the turns ratio m of the secondary winding for reception is 9.13 or more. When the fractions below decimal point are counted as a whole number, m becomes 10 (m=10). Accordingly, if the number of turns of the primary winding is 14T as discussed earlier, the number of turns of the secondary winding for reception N3 is 140T.

The value n of the turns ratio n:1 between the secondary winding for transmission N2 and the primary winding is set to an optimum value "2" within a range (e.g., n=1 to 3) which is no less than 1 and with which the transmission loss becomes negligible. The value m of the turn ratio 1:m between the primary winding and the secondary winding for reception N3 is set to, for example, an optimum value "10" within a range which is no less than 1 and with which the minimum value of the environmental noise level at the line side becomes equal to or higher than the floor noise level of the circuit at the receiving end.

The current limiting resistances R1a, R1b; the drive resistances R2a, R2b; and the terminating resistances R3a, R3b are set as follows. Modems for a power line carrier are required to be driven at the lowest possible impedance. Specifically, the drive resistance is set to the minimum value, e.g., about 6Ω in order that the driver can exert its maximum power. Accordingly, the drive resistances R2a, R2b connected to the ends of the secondary winding for transmission N2 are set to 3Ω respectively.

Figure 10:
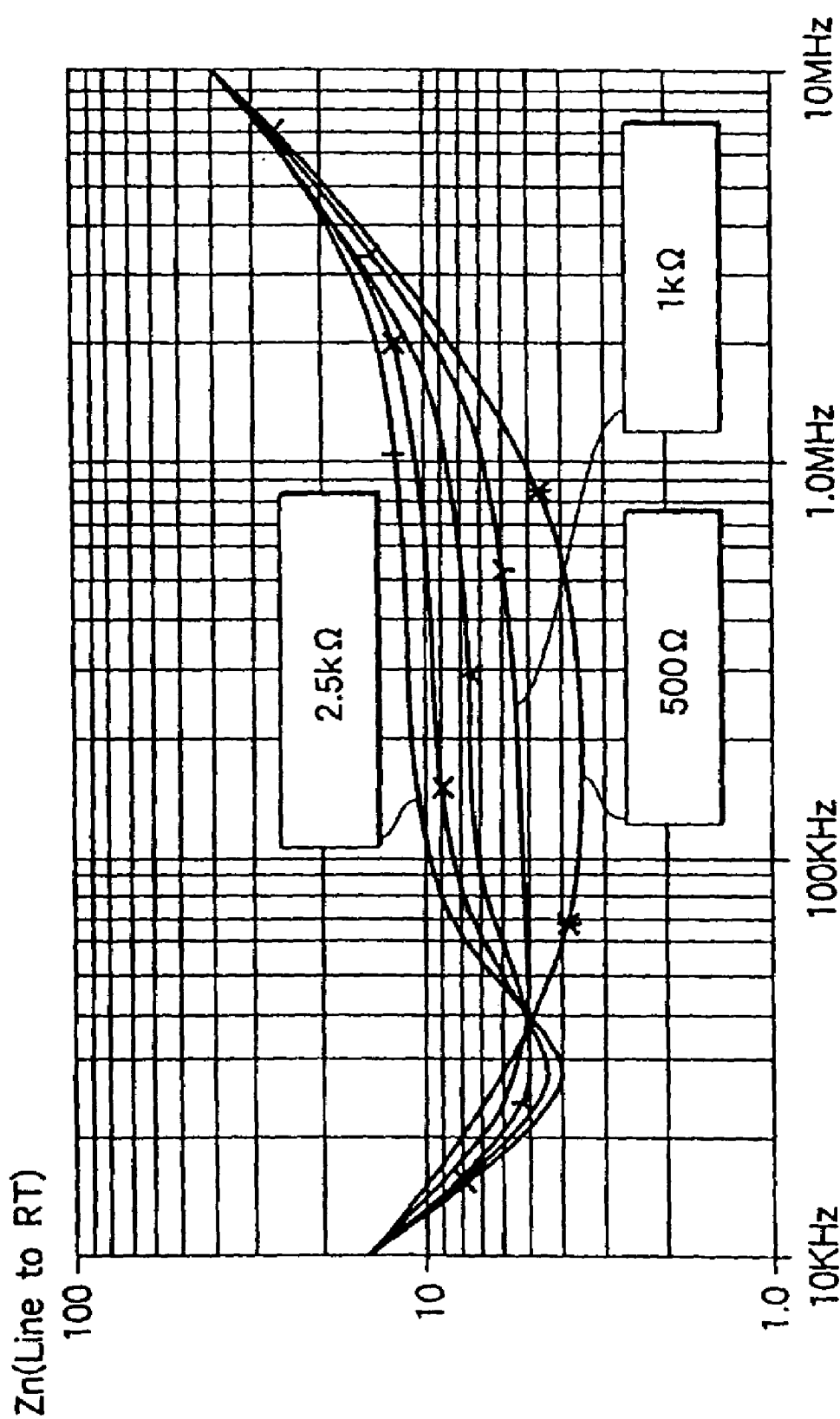
FIG. 10 is a selective explanatory diagram of a terminating resistance.

The terminating resistances R3a, R3b connected to the secondary winding for reception N3 affect the planarization of the receiving characteristics. When seeing the range of 500Ω to 2.5 kΩ in a frequency band of 10 kHz to 10 MHz in FIG. 10, it is understood that the planarization corresponding to about 1 kΩ is good.

If the resistance value of the current limiting resistances connected to the primary winding is increased, it becomes possible to bear the short-circuited condition of the windings as well as a great-amplitude noise current, but an input signal power decreases, leading to deterioration of the characteristics of transmission to the receiving end. A good simulation result was obtained when resistance was about 0.6Ω. In this case, a balance can be kept by setting the current limiting resistances R1a, R1b shown in FIG. 1 to 0.3Ω respectively (0.6Ω in total).

By properly setting the gap 1c of the core 1a of the transformer 1; the turns ratio between the primary winding and the secondary winding for transmission N2 and the turns ratio between the primary winding and the secondary winding for reception N3; the series resonance frequencies of inductances and the coupling capacitor C1; and the current limiting resistances R1a, R1b, the drive resistances R2a, R2b, and the terminating resistances R3a, R3b, the transmission THD characteristic can be kept good to enable high current drive at the transmitting end while the planarization of the receiving amplitude characteristic is enabled with good noise THD at the receiving end, even when the load impedance of the line is largely changed from a complete open condition to a complete short-circuited condition.

Regarding the relationship between the transformer 1 and the coupling capacitor C1, the following ranges are set. Specifically, a first range is set which is a range of inductance great enough to satisfy the transmitter signal distortion characteristic (the transmission THD characteristic) and the noise distortion characteristic (the noise THD characteristic) within the low frequency band of signals transmitted through the transformer 1. For instance, the first range is such a range that allows the transmitter signal distortion characteristic and noise distortion characteristic to be 20 dB or more. A second range is set which is a range of inductance small enough to bear high current drive and great amplitude noise current. For instance, the second range is such a range that allows a high current drive of 100 mA or more and a great amplitude noise current of 100 mA or more. A third range is set, which is a combined value of inductance and coupling capacitance C1 by which the series resonance frequency of the inductance of the primary winding of the transformer 1 and the coupling capacitor C1 becomes lower than the frequencies of the transmission band of the signals. A fourth range is set which is a combined value of leakage inductance and coupling capacitance C1, by which the series resonance frequency of the leakage inductance of the transformer 1 and the coupling capacitor 1 is within the transmission band. The factors of the transformer including the size etc. of the gap of the core and the capacity of the coupling capacitor C1 are determined so as to satisfy all the conditions of the first to fourth ranges.

As described earlier, the transformer 1 utilizes the small-sized core 1a having an amplitude permeability ($\mu$) of 4000 and a size of about 15×15×14 (mm). The primary winding has a single layered bifilar construction and is composed of two core wires (the primary windings N1a, N1b) serially connected to each other through the coupling capacitor C1. The number of turns of the primary winding is set to 14T (each core wire of the bifilar wound coil=7T). The numbers of turns of the secondary winding for transmission N2 and the secondary winding for reception N3 are set to 28T and 140T, respectively. The secondary winding for transmission N2 and the secondary winding for reception N3 are so arranged as to hold the primary winding between. The core 1a includes the gap 1c having a size of about 0.12 mm and has an inductance of about 40 µH. The coupling capacitor C1 is set to about 0.47 µF. The combined resistance value of the current limiting resistances R1a, R1b is set to 0.6Ω, the combined resistance value of the drive resistances R2a, R2b is set to 6Ω, and the combined resistance value of the terminating resistances R3a, R3b is set to 1 kΩ.

With the modem coupling circuit of the above preferred embodiment, the primary side of the transformer 1 bears 1.43 A and the following characteristics are obtained.

Figure 11:
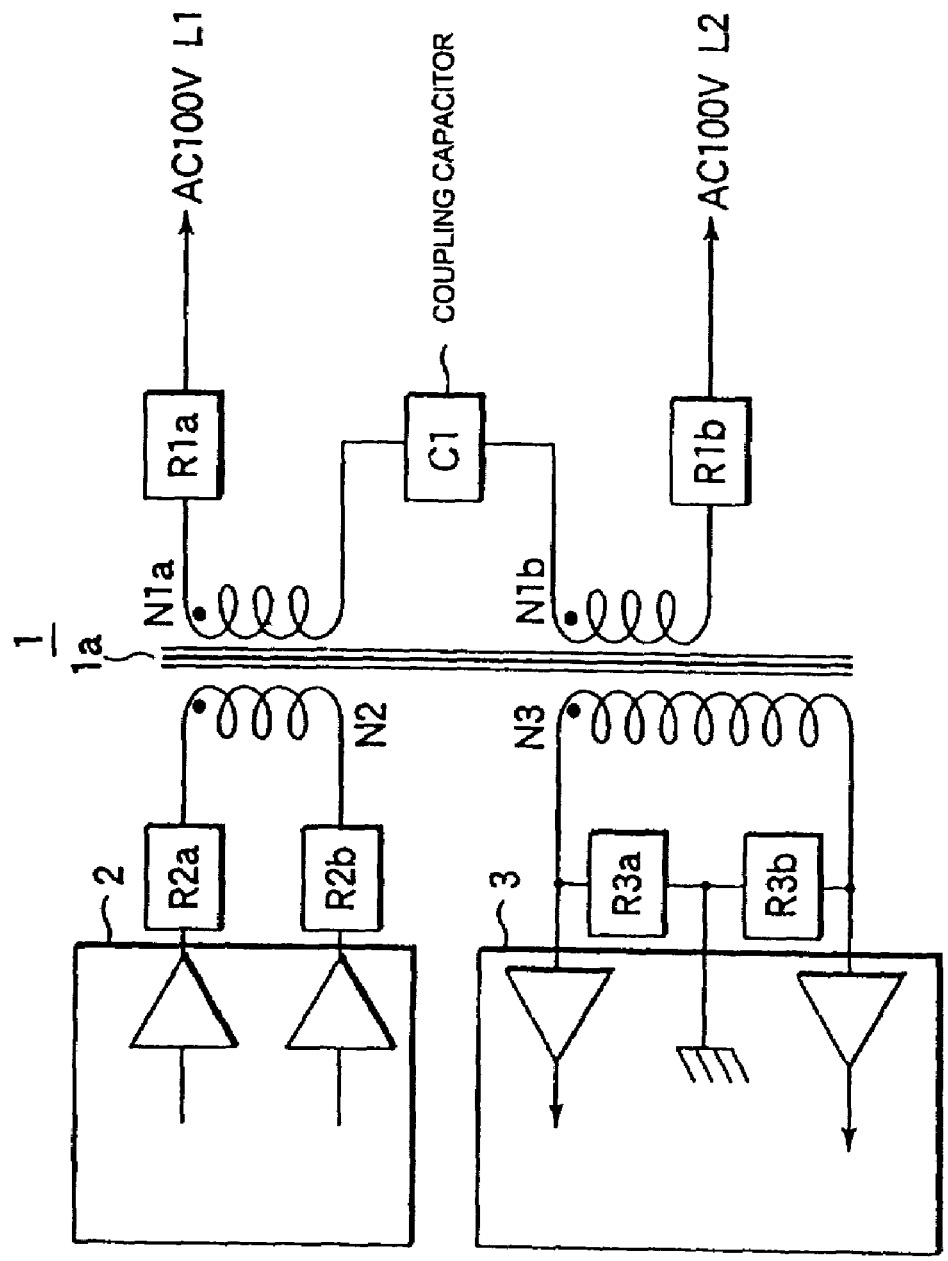
FIG. 11 is an explanatory diagram of another embodiment of the invention.

Line capacity=22.9 pF to 39 pF
Transmission ground balance=67.2 dB or more
Reception ground balance=57.3 dB or more
Transmission THD at a 10Ω terminal=57.2 dB or more
Transmission THD at a 0.1Ω+0.7 µH terminal=51.5 dB or more
Noise THD in a 0 to 50 kHz band=+25.7 dBm
Noise THD in a 50 to 450 kHz band=+23.5 dBm
The frequency of the peak value of drive current=173 kHz
Group delay characteristic at a 0.1Ω+0.7 µH terminal=2.83 µs
Drive inductance=1.6Ω
Maximum reception level=−1.4 dBm/kHz
Minimum reception level=−99.1 dBm/kHz (when the required S/N=15 dB)
Amplitude characteristic: Deviation value within the band at a 0.1Ω+0.7 µH terminal=4.65 dB FIG. 11 is an explanatory diagram of another embodiment of the invention. In FIG. 11, parts corresponding to those of FIG. 1 are indicated with the same reference numerals as in FIG. 1. This embodiment has a structure in which the current limiting resistances R1a, R1b connected to the primary winding of the transformer 1 are connected to the power lines L1, L2 respectively. Specifically, since the current limiting resistances R1a, R1b are for limiting a great amplitude noise current etc. flowing from the power lines L1, L2, current limitation can be carried out by either of the circuitries shown in FIGS. 1 and 11 upon condition that the current limiting resistances are connected between the connecting terminals for the power lines L1, L2.

Figure 12:
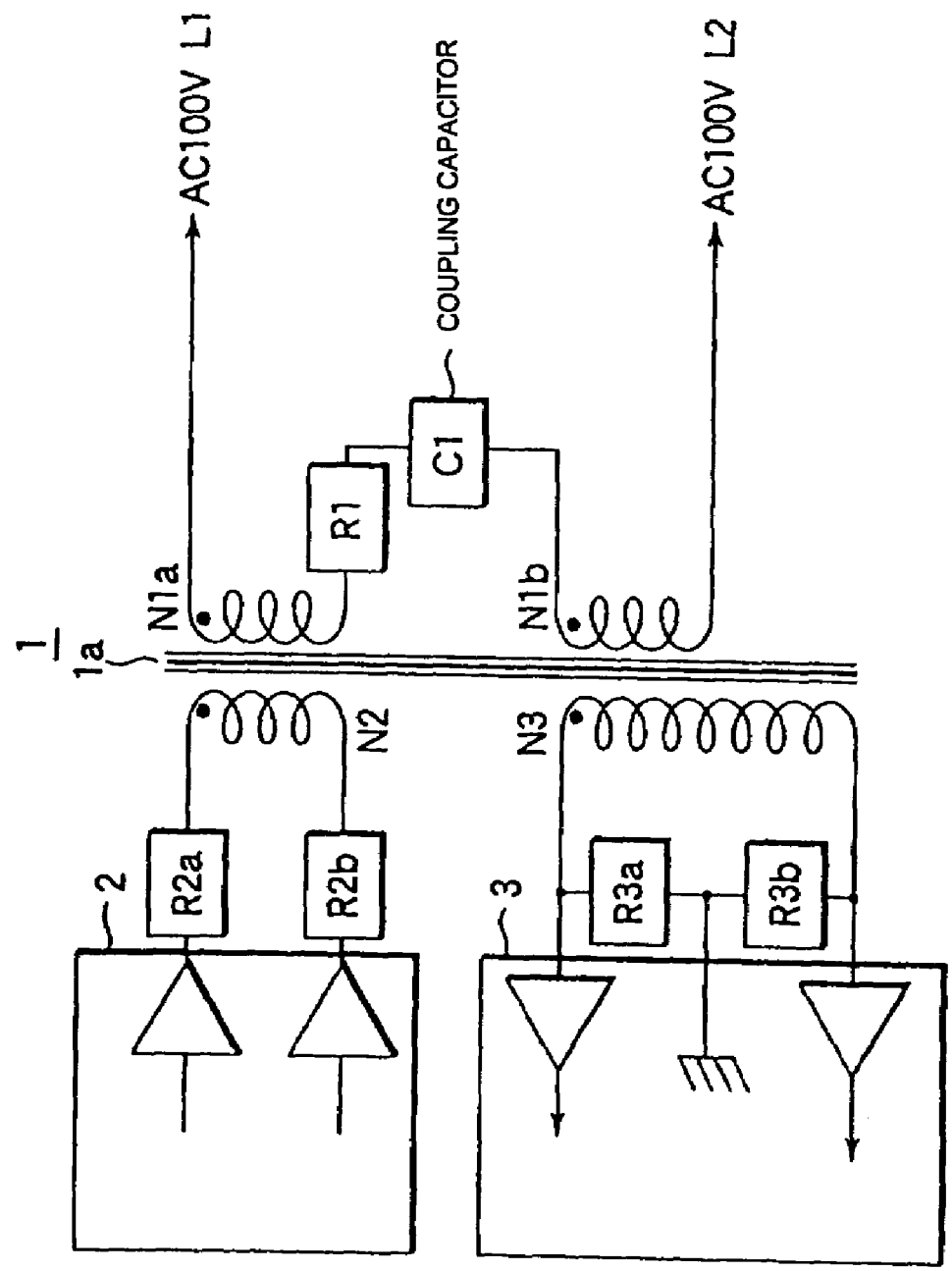
FIG. 12 is an explanatory diagram of still another embodiment of the invention.
Figure 13:
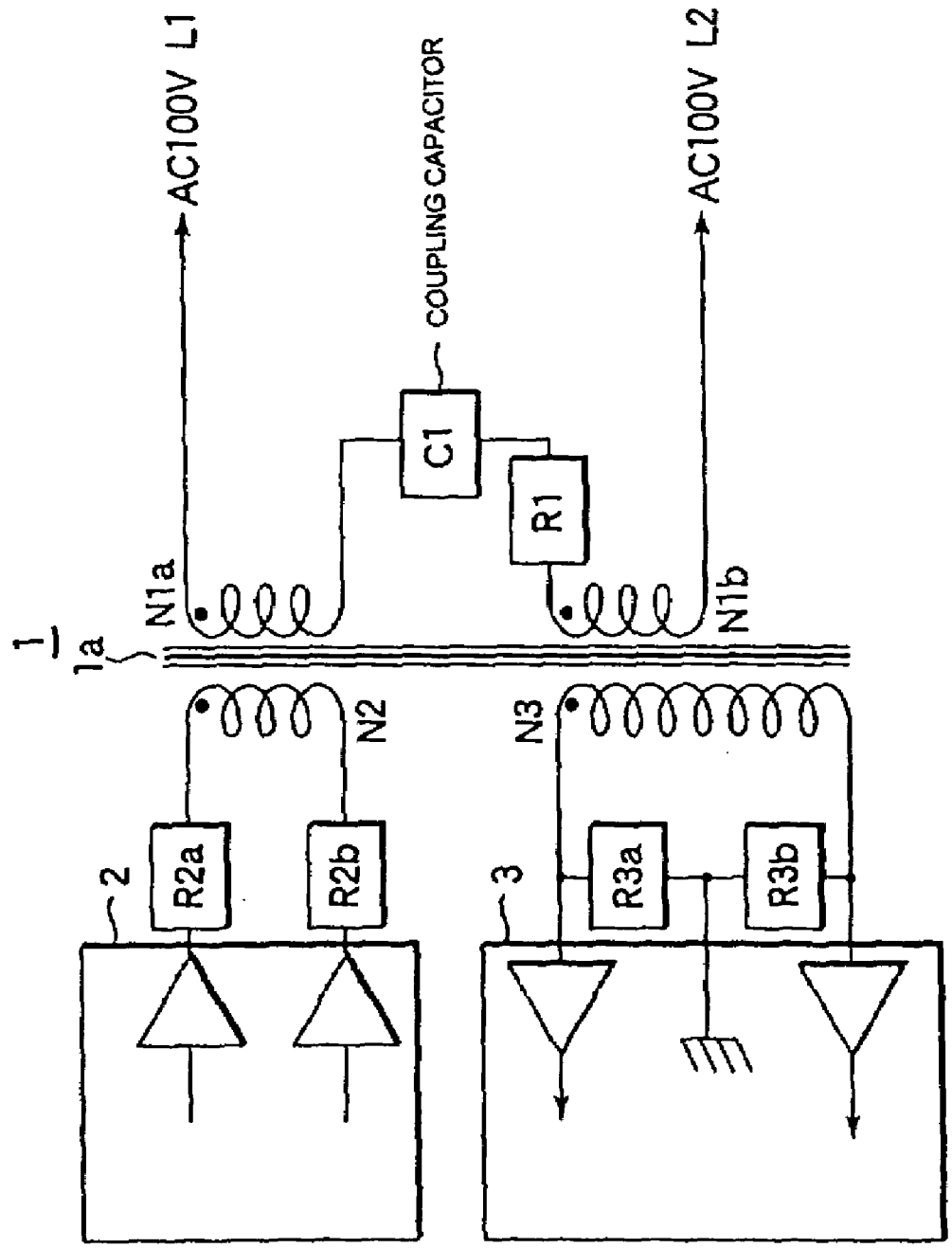
FIG. 13 is an explanatory diagram of still another embodiment of the invention.

FIG. 12 is an explanatory diagram of still another embodiment of the invention. In FIG. 12, parts corresponding to those of FIG. 1 are indicated with the same reference numerals as in FIG. 1. R1 denotes a current limiting resistance connected between one primary winding N1a of the bifilar wound coil N1 and the coupling capacitor C1. FIG. 13 shows a case where the current limiting resistance R1 is connected between the other primary winding N1b of the bifilar would coil N1 and the coupling capacitor C1. In the embodiments shown in FIGS. 12, 13, a simplified structure is obtained by use of a single current limiting resistance R1. In terms of balance, the structures shown in FIGS. 1 and 11 are better than in FIG. 12.

As described above, the transformer 1 is designed to permit high current thanks to the provision of the gap 1c of the core 1a; the primary winding at the line side of the transformer 1 has a single layered bifilar construction in which two core wires are serially connected to each other with a coupling capacitor C1 connected at the serial connection point; and the loaded circuits at the transmitting and receiving ends and at the line side when viewed from the transformer are accordingly well balanced. Therefore, even if the deviation of the coupling capacitor C1 is great, an excellent ground balance can be ensured, and the undesirable leakage electromagnetic field can be minimized by decreasing common mode leakage current at the transmitting end while proof strength against common mode noise can be dramatically improved at the receiving end.

The transmitting circuit 2 is connected to the secondary winding for transmission N2 of the transformer 1 whereas the receiving circuit 3 is connected to the secondary winding for reception N3, and the secondary windings N2, N3 are serially separated. A sandwich construction in which the primary winding is sandwiched between the secondary windings N2, N3 is employed, thereby minimizing the leakage inductance. In addition, by optimizing the value of the inductance at the line primary side and the value of the coupling capacitor C1, high current drive is permitted at the transmitting end and good transmission characteristics are ensured at the receiving end.

Further, a current limiting resistance is connected to the primary winding, and the receiving end is used as the load at the transmitting end while the transmitting end is used as the load at the receiving end, so that big fluctuations in the load imposed on the lines can be resisted. As a first range, a range of inductance, which is large enough to make the transmission THD characteristic in a low frequency band and the noise THD characteristic be 25 dB, is set. As a second range, a range of inductance which is small enough to bear a high current drive of 100 mA or more and a great amplitude noise current of 100 mA or more, is set. As a third range, a range of a combined value of inductance and coupling capacitance, which makes the series resonance frequency of the inductance at the primary side and the coupling capacitor C1 be within a frequency band lower than the transmission band, is set. As a forth range, a range of a combined value of leakage inductance and coupling capacitance, which makes the series resonance frequency of the leakage inductance of the transformer and the coupling capacitor C1 be within the transmission band, is set. Then, the inductance and coupling capacitance which meet the AND conditions of the first to fourth ranges are selected. For instance, the inductance may be set to 40 µH and the coupling capacitance may be set to 0.47 µF. Thereby, high current drive is enabled on the transmitting end with a good transmission THD characteristic having a current peak point within the transmission band, while good receiving characteristics such as the noise THD characteristic and group delay characteristic are ensured on the receiving end.

The invention is not limited to the embodiments described above but may be modified variously. The amplitude permeability µ of the core 1a of the transformer 1 and the turns ratios of the primary winding and the secondary windings N2, N3 may differ from those noted in the foregoing embodiment. Also, the position and shape of the gap 1c of the core middle leg 1b may be altered. It is apparent that the invention is applicable not only to a band of 10 kHz to 450 kHz but also to a high frequency band such as a band of 1.7 MHz to 30 MHz, by changing its constant values.

INDUSTRIAL APPLICABILITY

According to the invention, in a modem coupling circuit used in a power line carrier for coupling the transmitting circuit 2 and the receiving circuit 3 of a modem for a power line carrier to the power lines L1, L2, (i) a gap is formed in the core 1a of the transformer 1 to obtain a desired inductance; (ii) the primary windings connected to the power lines L1, L2 have a single-layered bifilar construction and are serially connected through the coupling capacitor C1; and (iii) the secondary winding for transmission N2 and the secondary winding for reception N3 are provided so as to hold the primary windings between, thereby reducing leakage inductance; (iv) characteristics including the coupling capacitance 1 are optimized to ensure good ground balance at the level of, for example, about 70 dB at the transmitting end and about 60 dB at the receiving end, even if the deviation of the coupling capacitor C1 is about ±20%; and (v) the undesired leakage electromagnetic field is minimized by decreasing common mode leakage current at the transmitting end while proof strength against common mode noise is dramatically improved at the receiving end.

According to the invention, a high current drive of about 1.4 is allowed at the transmitting end and good transmission characteristics (e.g., a group delay characteristic of 3 µS or less and an in-band amplitude characteristic of 5 dB or less) can be achieved at the receiving end. Further, the current limiting resistance is connected to the primary winding of the transformer 1, thereby allowing the receiving end to act, at the transmitting end, as a load equivalent to the transmitting end and allowing the transmitting end to act, at the receiving end, as a load equivalent to the receiving end, so that the transformer 1 can stably perform its operation, resisting big load fluctuations in the lines.

In addition, the optimization of the parameters including the coupling capacitor C1 and others makes it possible to achieve a good transmission THD characteristic of about 60 dB and a high current drive of about 1.4 A with a current peak point in the transmission band at the transmitting end, and to achieve good receiving characteristics such as a group delay characteristic of 3 µs or less. At the transmitting end, low inductance drive is enabled. At the receiving end, processing of receiver signals having an amplitude as small as −99.1 dBm/kHz (when the required S/N=15 dB) is enabled by setting the turns ratio m to, for example, about 10. Further, the provision of the terminating resistances connected to the secondary winding for reception N3 enables planarization of a receiving amplitude characteristic of e.g., 5 dB or less under conditions where the noise THD is about 60 dB.

What is claimed is:

1. A modem coupling circuit for a power line carrier, which is connected to power lines for transmitting and receiving data, the modem coupling circuit comprising:
    (a) a transformer having
        a core including a gap formed therein,
        primary windings constituting a bifilar wound coil which is wound around the core, forming a single layer; and a secondary winding for transmission and a secondary winding for reception which hold the single layer of the primary windings therebetween from above and below;

(b) a coupling capacitor connected to a middle point between first ends of the primary windings having a bifilar construction such that the primary windings having a bifilar construction are serially connected to each other with their second ends being connected to the power lines respectively, wherein the secondary winding for transmission is connected to a transmitting circuit, and wherein the secondary winding for reception is connected to a receiving circuit; and (c) current limiting resistances connected to the primary windings having a bifilar construction respectively.

2. The modem coupling circuit for a power line carrier according to claim 1, wherein the transformer and the coupling capacitor are formed so as to satisfy first to fourth ranges, the first range being a range of inductance which is large enough to fully satisfy a transmitter signal distortion characteristic and a noise distortion characteristic within a low frequency band of a transmission band for signals transmitted through the transformer;

the second range being a range of inductance which is small enough to bear high current drive and great amplitude noise current;

the third range being a range of a combined value of inductance and coupling capacitance which value is large enough to allow a series resonance frequency of the inductance of the primary windings of the transformer and the coupling capacitor to be a low frequency outside the transmission band of the signals; and the fourth range being a range of a combined value of a leakage inductance of the transformer and the coupling capacitance which value allows a series resonance frequency of the leakage inductance and the coupling capacitor to be within the transmission band.

3. The modem coupling circuit for a power line carrier according to claim 1, wherein the core, gap and windings of the transformer are formed and the value of the coupling capacitor is determined such that first to fourth ranges are satisfied, the first range being a range of inductance by which a transmission signal distortion characteristic in a low frequency band of a transmission band of signals transmitted through the transformer and a noise distortion characteristic become 20 dB or more;

the second range being a range of inductance which bears a high current drive of 100 mA or more and a great amplitude noise current of 100 mA or more;

the third range being a range of a combined value of inductance and coupling capacitance by which a series resonance frequency of the inductance of the primary windings of the transformer and the coupling capacitor becomes lower than the frequencies of the transmission band of the signals; and the fourth range being a range of a combined value of a leakage inductance of the transformer and the coupling capacitance which value allows a series resonance frequency of the leakage inductance and the coupling capacitor to be within the transmission band.

4. The modem coupling circuit for a power line carrier according to claim 1, wherein the gap in the core of the transformer is formed according to a permissible current value of the primary windings and an inductance by which a transmission signal distortion characteristic and a noise distortion characteristic become 20 dB or more.

5. The modem coupling circuit for a power line carrier according to claim 1, wherein the current limiting resistances are connected to the primary windings of the transformer, the transmitting circuit is connected to the secondary winding for transmission of the transformer through drive resistances and terminating resistances are connected to the secondary winding for reception of the transformer.

6. The modem coupling circuit for a power line carrier according to claim 1, wherein n of the turns ratio n:1 of the secondary winding for transmission of the transformer to the primary windings of the transformer is set to about 2, and m of the turns ratio m:1 of the secondary winding for reception to the primary windings is set to a value by which an environmental noise level becomes substantially equal to a floor noise level.

7. The modem coupling circuit for a power line carrier according to claim 1, wherein the inductance of the transformer is set to 40 $\mu H \pm 10$ $\mu H$ by the provision of the gap of the core of the transformer.

* * * * *